US011560057B2

(12) United States Patent
Kim et al.

(10) Patent No.: US 11,560,057 B2
(45) Date of Patent: Jan. 24, 2023

(54) DEVICE AND METHOD FOR DISPLAYING CONTENT

(71) Applicant: Samsung Electronics Co., Ltd., Gyeonggi-do (KR)

(72) Inventors: Kyu Sung Kim, Gyeonggi-do (KR); Tae Young Ha, Gyeonggi-do (KR); Ju Yeon You, Gyeonggi-do (KR); Yong Jun Lim, Gyeonggi-do (KR); Jin Young Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 186 days.

(21) Appl. No.: 16/771,986

(22) PCT Filed: Nov. 2, 2018

(86) PCT No.: PCT/KR2018/013225
§ 371 (c)(1),
(2) Date: Jun. 11, 2020

(87) PCT Pub. No.: WO2019/117459
PCT Pub. Date: Jun. 20, 2019

(65) Prior Publication Data
US 2021/0078407 A1    Mar. 18, 2021

(30) Foreign Application Priority Data
Dec. 11, 2017 (KR) .................... 10-2017-0169274

(51) Int. Cl.
*B60K 35/00*    (2006.01)
*G06K 9/00*    (2022.01)
(Continued)

(52) U.S. Cl.
CPC .............. *B60K 35/00* (2013.01); *G06V 10/56* (2022.01); *G06V 20/584* (2022.01);
(Continued)

(58) Field of Classification Search
CPC ..................... B60R 1/00; B60R 2300/8093
See application file for complete search history.

(56) References Cited

U.S. PATENT DOCUMENTS

| 8,269,652 B2 | 9/2012 | Seder et al. |
| 2007/0219720 A1* | 9/2007 | Trepagnier ........... G05D 1/0278 701/300 |

(Continued)

FOREIGN PATENT DOCUMENTS

| JP | 2007-198962 | 8/2007 |
| JP | 2014-0235550 | 12/2014 |

(Continued)

OTHER PUBLICATIONS

PCT/ISA/210 Search Report issued on PCT/KR2018/013225 pp. 5 (dated Jun. 20, 2019).

(Continued)

*Primary Examiner* — Nan-Ying Yang
(74) *Attorney, Agent, or Firm* — The Farrell Law Firm, P.C.

(57) ABSTRACT

An electronic device attachable to a vehicle, according to various embodiments of the present invention, comprises: a communication interface; a memory for storing instructions; and at least one processor connected to the communication interface and the memory, wherein the at least one processor can be configured so as to execute the stored instructions in order to: acquire, from another device embedded in the vehicle, information on a plurality of objects located within a designated distance from the vehicle; identify, among the plurality of objects, a designated object located within a designated distance from the vehicle; generate configuration information of at least one piece of content to be displayed through a head-up display (HUD), on the basis of a state of the designated object; and display, through the HUD, con- (Continued)

tent for guiding the operation of the vehicle, on the basis of the generated configuration information.

11 Claims, 13 Drawing Sheets

(51) Int. Cl.
  *G06K 9/46* (2006.01)
  *G06V 10/56* (2022.01)
  *G06V 20/58* (2022.01)
(52) U.S. Cl.
  CPC ............... *B60K 2370/1529* (2019.05); *B60K 2370/166* (2019.05); *B60K 2370/177* (2019.05); *B60K 2370/179* (2019.05); *B60K 2370/785* (2019.05)

(56) References Cited

U.S. PATENT DOCUMENTS

| | | |
|---|---|---|
| 2014/0266656 A1 | 9/2014 | Ng-Thow-Hing et al. |
| 2014/0267263 A1 | 9/2014 | Beckwith et al. |
| 2014/0267398 A1 | 9/2014 | Beckwith et al. |
| 2014/0278066 A1 | 9/2014 | Gottlieb |
| 2015/0168720 A1 | 6/2015 | Oh et al. |
| 2016/0163108 A1 | 6/2016 | Kim |

FOREIGN PATENT DOCUMENTS

| | | | |
|---|---|---|---|
| JP | 2014235550 | 12/2014 | |
| JP | 2015166230 | 9/2015 | |
| JP | 201781456 | 5/2017 | |
| KR | 1998-0069668 | 10/1998 | |
| KR | 1020150054022 | 5/2015 | |
| KR | 1020170082761 | 7/2017 | |
| KR | 1020170101758 | 9/2017 | |
| WO | WO 2017/095116 | 6/2017 | |
| WO | WO-2017095116 A1 * | 6/2017 | ............. G01C 21/34 |

OTHER PUBLICATIONS

PCT/ISA/237 Written Opinion issued on PCT/KR2018/013225, pp. 19 (dated Jan. 2, 2019).
European Search Report dated Dec. 15, 2021 issued in counterpart application No. 18887432.5-1012, 4 pages.
European Search Report dated Dec. 15, 2020 issued in counterpart application No. 18887432.5-1012, 8 pages.
Korean Office Action dated Jun. 21, 2022 issued in counterpart application No. 10-2017-0169274, 21 pages.
Korean Office Action dated Oct. 19, 2022 issued in counterpart application No. 10-2017-0169274, 8 pages.

* cited by examiner

DEVICE AND METHOD FOR DISPLAYING CONTENT

PRIORITY

This application is a National Phase Entry of International Application No. PCT/KR2018/013225, which was filed on Nov. 2, 2018, and claims priority to Korean Patent Application No. 10-2017-0169274, filed in the Korean Intellectual Property Office on Dec. 11, 2017, the content of each of which is incorporated herein by reference.

TECHNICAL FIELD

Various embodiments relate to a method and an electronic device for displaying a content through a head-up display (HUD) based on information acquired for a designated object.

BACKGROUND ART

With the development of technology for electronic devices, an electronic device provides convenience to a user in various ways. For example, the electronic device may be connected to an object to provide various pieces of information for making good use of the object. The object may include, for example, a vehicle. When the electronic device is connected to the vehicle, the electronic device may provide information related to driving of the vehicle. Information related to driving of the vehicle may include, for example, information for route guidance. In this case, the electronic device may display information for route guidance on a windshield of the vehicle to prevent diversion of the attention of a user driving the vehicle.

DISCLOSURE OF INVENTION

Technical Problem

An electronic device may provide information for route guidance, based on information included in a server or a database. In this case, since the provided information is pre-acquired information, there is a problem that it is impossible to provide information on a driving environment which changes in real time.

Various embodiments may provide an electronic device and a method for providing information on an environment adjacent to a vehicle by receiving information from an external device embedded in the vehicle.

The technical subjects pursued in the disclosure may not be limited to the above-mentioned technical subjects, and other technical subjects which are not mentioned may be clearly understood, through the following descriptions, by those skilled in the art to which the disclosure pertains.

Solution to Problem

According to various embodiments, an electronic device attachable to an inside of a vehicle may include a communication interface, a memory configured to store instructions, and at least one processor connected to the communication interface and the memory, wherein the at least one processor is configured to execute the stored instructions in order to: acquire, from another device embedded in the vehicle, information on a plurality of objects located within a designated distance from the vehicle; identify, among the plurality of objects, a designated object located within the designated distance from the vehicle; generate configuration information of at least one content to be displayed through a head-up display (HUD), based on a state of the designated object; and display, through the head-up display, a content for guiding an operation of the vehicle, based on the generated configuration information.

According to various embodiments, a method (or an operation method) for an electronic device attachable to an inside of a vehicle may include: acquiring, from another device embedded in the vehicle, information on a plurality of objects located within a designated distance from the vehicle; identifying, among the plurality of objects, a designated object located within the designated distance from the vehicle; generating configuration information of at least one content to be displayed through a head-up display, based on a state of the designated object; and displaying, through the head-up display, a content for guiding an operation of the vehicle, based on the generated configuration information.

According to various embodiments, a non-transitory computer-readable storage medium may include at least one program for executing operations of: acquiring, from another device embedded in a vehicle, information on a plurality of objects located within a designated distance from the vehicle; identifying, among the plurality of objects, a designated object located within the designated distance from the vehicle; generating configuration information of at least one content to be displayed through a head-up display, based on a state of the designated object; and displaying, through the head-up display, a content for guiding an operation of the vehicle, based on the generated configuration information.

Advantageous Effects of Invention

An electronic device and an operation method therefor according to various embodiments can provide enhanced information to a user by displaying a content for guiding an operation of a vehicle, based on information on an external environment received from another device related to the electronic device.

The effects obtainable from the disclosure are not limited to the above-mentioned effects, and other effects not mentioned can be clearly understood by a person skilled in the art to which the disclosure belongs in view of the following description.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Figure 1:
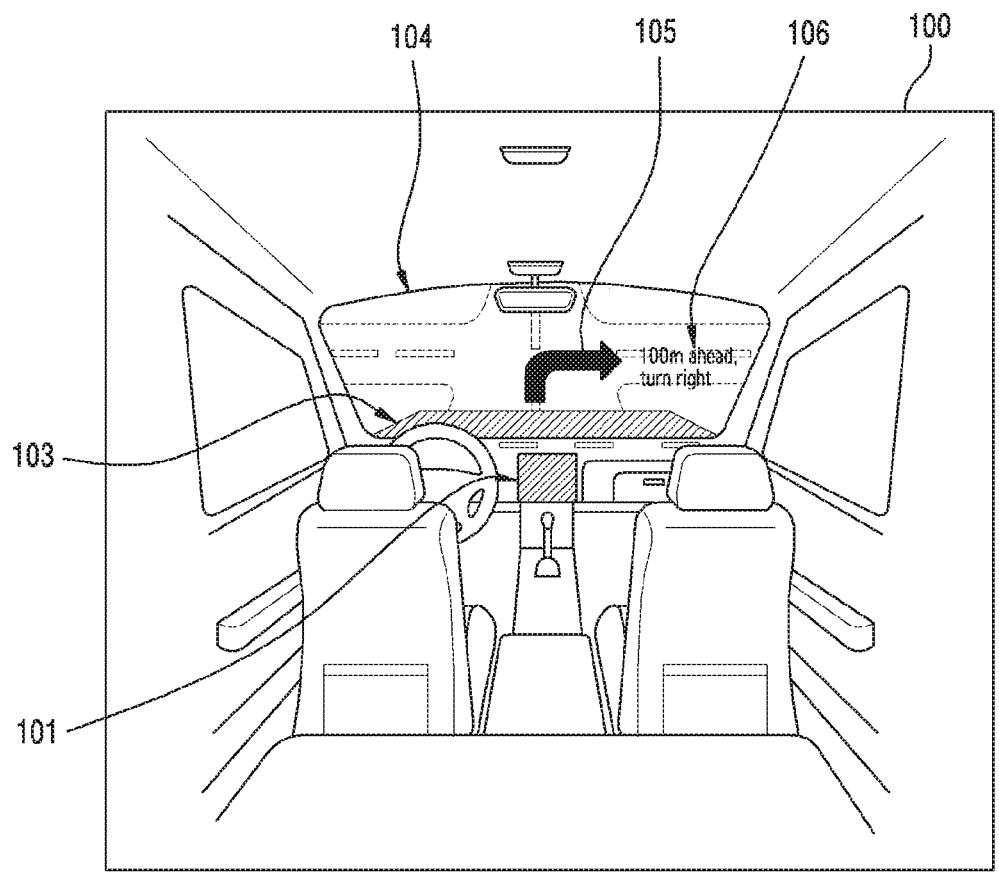
FIG. 1 illustrates an example of an environment including an electronic device according to various embodiments.

FIG. 1 illustrates an example of an environment in a vehicle including an electronic device, according to various embodiments.

Referring to FIG. 1, an electronic device 101 may be located in a fixed or movable form in a vehicle. For example, the electronic device 101 may be located in front of a driver's seat and a passenger seat of the vehicle. For another example, the electronic device 101 may exist in a fixed (or movable) form in the fore (e.g., a windshield 104) of the vehicle. The electronic device 101 may be located in various places for providing information to a user, and is not limited to the illustrated example. The electronic device 101 may be located in an in-vehicle environment 100, and thus provide various pieces of information related to the vehicle to a user of the vehicle.

According to various embodiments, in the in-vehicle environment 100, the electronic device 101 may communicate with another device 103 (or an external device) through a network (e.g., wired communication or wireless communication). Based on the communication, the electronic device 101 may receive information from another device 103. In various embodiments, the electronic device 101 may generate a content, based on the received information. The electronic device 101 may generate a 2-dimensional (2D) image, a text, a 3-dimensional (3D) image, or an augmented reality (AR) image, based on the received information. The generated content may include an opaque or translucent content. The electronic device 101 may display a content on the windshield 104 through a head-up display (HUD) (e.g., a head-up display 210 of FIG. 2) included in (or connected to) the electronic device 101. The electronic device 101 may provide the content (e.g., the 3D image or the AR image) mapped to a recognizable object of reality through the windshield 104. The detailed description of the head-up display will be described with reference to FIG. 2 described later.

According to various embodiments, the electronic device 101 may receive information related to a vehicle from another device 101, based on communication with another device 103. The information related to the vehicle may include, for example, information on a location of the vehicle and information on a route of the vehicle. Based on the received information, the electronic device 101 may generate a content for display on the windshield 104. The electronic device 101 may display the generated content on the windshield 104 of the vehicle. In some embodiments, the electronic device 101 may receive information from a server. For example, the electronic device 101 may receive information for route guidance from a server of a route guidance application, based on the route guidance application. In some other embodiments, the electronic device 101 may receive information from another vehicle or another electronic device located around the vehicle. For example, based on a network (e.g., a device-to-device (D2D) network, a short-range wireless communication, Bluetooth, or a long term evolution (LTE) D2D technology), the electronic device 101 may receive information from another vehicle located within a designated distance (or another electronic device included in another vehicle or another electronic device outside the vehicle).

In various embodiments, the electronic device 101 may generate (or acquire) information related to a vehicle through at least one component included in the electronic device 101. In some embodiments, the electronic device 101 may include at least a part of another device 103. The electronic device 101 may include at least a part of the another device to generate (or acquire) information related to the vehicle. For example, the electronic device 101 may include a global positioning system (GPS) sensor, and may acquire information on a location of the vehicle, based on the included GPS sensor. In some other embodiments, the electronic device 101 may include an in-vehicle infotainment (IVI) system, or may be connected by wire or wirelessly to an IVI device in a vehicle which provides the IVI system. The electronic device 101 may acquire various pieces of information related to the vehicle including the electronic device 101 through the IVI system. For example, the electronic device 101 may acquire information for route guidance by using the IVI system. For another example, the electronic device 101 may acquire information on the volume of music being played in the vehicle or the temperature in the vehicle by using the IVI system. According to embodiments, the electronic device 101 may include the IVI system in the form of an application program.

In various embodiments, the electronic device 101 may include a light source, and may generate light for indicating configuration information of a content (or a content) through the light source. The head-up display included in the electronic device 101 may include a light source, and may generate light for indicating configuration information of a content (or a content), based on the included light source.

The generated light may be translucent and include a 3D content which can be displayed by overlapping with a real object. The electronic device 101 may display a content so as to be mapped (or matched or corresponded) to a real object by emitting (or projecting) the generated light to (or onto) the windshield 104.

In various embodiments, another device 103 may be embedded in a vehicle. In this case, another device 103 may be located at a designated location of the vehicle. For example, another device 103 may be located in a bonnet portion. In some embodiments, another device 103 may have a functional configuration which refers to a plurality of devices mounted in the vehicle. For example, another device 103 may include a first device (e.g., a light detection and ranging (LiDAR) sensor) and a second device (e.g., a radio detecting and ranging (RADAR) sensor). When another device 103 includes the first device or the second device, a location of the first device and a location of the second device may be different from each other. For example, the first device may be located in the fore portion (e.g., a bonnet) of the vehicle, and the second device may be located in the rear portion (e.g., a trunk) of the vehicle. FIG. 1 illustrates an example for convenience of explanation of the disclosure, but is not limited thereto.

In various embodiments, another device 103 embedded in a vehicle may include various sensors mounted to the vehicle. The sensors may include, for example, at least one of a LiDAR sensor, a RADAR sensor, an image sensor, an ultrasonic sensor, and a GPS sensor. According to an embodiment, another device 103 may include at least one of a camera, a high definition (HD) map system, an on-board diagnostics (OBD), and an advanced driver assistance system (ADAS).

In various embodiments, the windshield 104 may include at least a part of glass of the fore (or the front side) of a vehicle. The windshield 104 may include elements for projection of an image. For example, the windshield 104 may include a special film, outer glass, and inner glass. The windshield 104 may be configured by a combination of the outer glass and the inner glass, the special film being disposed between the outer glass and the inner glass. A virtual image projected from the electronic device 101 may be displayed on the windshield 104. For example, a virtual environment may include a 2D or 3D content. Referring to the illustrated description, the electronic device 101 may display, on the windshield 104, an arrow shape (e.g., a content 105) for guiding a route or a text (e.g., a content 106) for guiding the route.

Although not illustrated, in various embodiments, the windshield 104 may be configured as a separate glass plate which can be disposed to overlap with the front glass of a vehicle. The windshield 104 may be configured as a part of the electronic device 101. The windshield 104 of the disclosure may refer to various glass plates which can display a content generated by the electronic device 101, and is not limited to the above-described terms or examples of the above-described configuration.

The electronic device 101 according to various embodiments to be described later can accurately provide information required for driving of a vehicle by changing information on route guidance according to a sensor value measured in real time. According to embodiments, the electronic device 101 can provide various experiences or a realistic guide to a user of the vehicle by providing a content (a 3D content or an AR content) mapped to an object of reality. The electronic device 101 can prevent diversion of a driver's attention to a dashboard or a navigation system by displaying a content in the driver's visible area, and thus guide safe driving.

Figure 2:
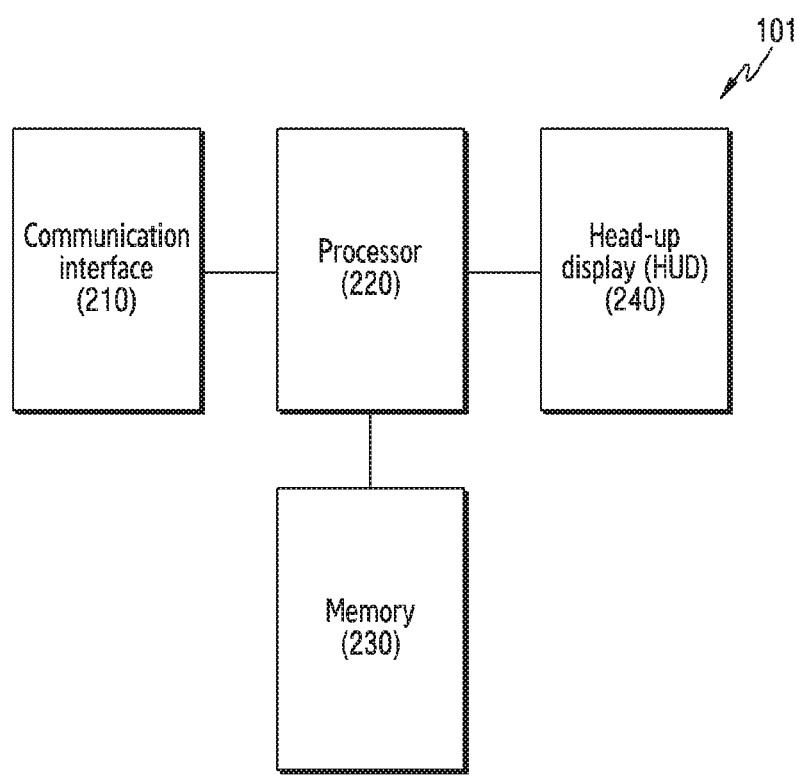
FIG. 2 is a block diagram of an electronic device according to various embodiments.

FIG. 2 is a block diagram of an electronic device according to various embodiments. The electronic device of FIG. 2 may be the electronic device 101 of FIG. 1. Referring to FIG. 2, the electronic device 101 may include a communication interface 210, a processor 220, a head-up display (HUD) 240, or a memory 230. According to embodiments, at least one (e.g., the head-up display 240 or the communication interface 210) of the components in the electronic device 101 may be omitted or another component may be added to the electronic device 101. For example, at least one sensor (e.g., a GPS sensor) included in the electronic device 101 and another device 103 may be integrated and implemented.

The processor 220 may control, for example, at least one other component (e.g., hardware or a software component) of the electronic device 101, the component being connected to the processor 220, by driving software, and perform various data processing and operations. The processor 220 may load instructions or data received from another component (e.g., the communication interface 210) into a part (e.g., a volatile memory) of the memory 230 and process the instructions or data, and store the resulting data in another part (e.g., a non-volatile memory) of the memory 230. In some embodiments, the processor 220 may include a main processor (e.g., a central processing unit or an application processor) and a coprocessor (e.g., a graphic processing device, an image signal processor, a sensor hub processor, or a communication processor) which is operated independently from the main processor and, additionally or alternatively, uses less power than the main processor, or is specialized in a designated function. The coprocessor may be operated separately from the main processor or embedded in the main processor.

For example, the co-processor may control at least a part of functions or states related to at least one component (e.g., the communication interface 210) of the components of the electronic device 101, in place of the main processor while the main processor is in an inactive (e.g., sleep) state, or with the main processor while the main processor is in an active (e.g., performs an application) state. According to an embodiment, the coprocessor (e.g., a communication processor) may be implemented as a part of functionally related other components (e.g., the communication interface 210).

In various embodiments, the processor 220 may be connected by wire or wirelessly to the communication interface 210. The processor 220 may receive information from another electronic device (e.g., another device 103, a server, or a device outside a vehicle) through the communication interface 210. The processor 220 may determine information related to a vehicle including the electronic device 101, based on the information (e.g., a sensor value) received from another device 103. For example, the processor 220 may determine (or analyze) driving information of the vehicle including the electronic device 101, based on the received information. For another example, the processor 220 may determine (or analyze or acquire) information on at least one of another vehicle, a nearby object (e.g., a traffic light, a sign, or a person), a surrounding environment (e.g., the shoulder of a road, a crosswalk, a school zone or a stop line), a signaling system, a lane width, a location of a lane where a vehicle is currently located, a geographic location of a vehicle, or a speed, based on the received information.

In various embodiments, the processor 220 may generate configuration information of a content (or a content) for guiding movement of a vehicle. The processor 220 may generate configuration information of a content (or a content) including a 2-dimensional (2D) or 3-dimensional (3D) image for guiding driving information. In some embodiments, the memory 230 may include configuration information of each content (or a content) according to a distance from a designated object, and the processor 220 may identify information on at least one content for guiding driving information among information on contents included in the memory 230. In some other embodiments, the processor 220 may generate configuration information of a content (or a content) for guiding driving information, based on a rendering scheme. For example, the processor 220 may generate a 3D content through a rendering process which generates a 3D image. In some other embodiments, the processor 220 may generate a 3D content, based on a scheme of applying external information, such as a light source, a location, or a color, to a 2D content.

In various embodiments, the processor 220 may acquire (or identify) a content corresponding to driving information by using information stored in the memory 230 or the server. Based on information on the vehicle including the electronic device 101 (e.g., a location of the vehicle, a shape of the vehicle, or a speed of the vehicle), the processor 220 may identify configuration information of a content (or a content) for guiding movement of the vehicle. The processor 220 may acquire (or identify) configuration information of a content for indicating a route through the memory 230 or the server, based on information for guiding the route of the vehicle.

In various embodiments, in order to map the generated content (or the acquired content) to an object of reality and display the content, the processor 220 may determine a location where the content is to be displayed. In order to display the generated content so as to correspond to the front environment, the processor 220 may determine a location where the content is to be displayed. The processor 220 may receive information on at least one object through another device 103. Based on the received information, the processor 220 may determine a location of the at least one object. The processor 220 may determine a location where the content is to be displayed, based on the determined location of the object. For example, the processor 220 may receive, from another device 103, information on locations of lanes where the vehicle is located. Based on the received information, the processor 220 may determine a location where the generated content is to be displayed, so as to allow the generated content to be displayed in the middle area of the lanes. For another example, the processor 220 may receive, from another device 103, information on a location of another vehicle located in front. Based on the received information, the processor 220 may determine a location where the generated content is to be displayed, so as to allow the generated content to be displayed to correspond to a space with the another vehicle. The information related to the above-described location where the content is to be displayed, the size of the content, or the form of the content may be included in the configuration information of the content.

In various embodiments, the head-up display 240 may display the generated content (or acquired content). The head-up display 240 may include components for displaying a content on the windshield 104 of FIG. 1. The head-up display 240 may include, for example, at least one of an LED-array capable of generating image information, an LED power source capable of supplying a current to the LED-array, or a thin film transistor (TFT)-projection display for displaying image information.

In various embodiments, the head-up display 240 may generate light to indicate a content on the windshield 104. The head-up display 240 may generate translucent light corresponding to the content to indicate the content on the windshield 104. The head-up display 240 may emit (or project) the generated light to (or onto) the windshield 104 such that the content is displayed through the windshield 104. The head-up display 240 may display the content by projecting the generated light onto the windshield 104. The light is projected, so that the content may be displayed with an object of reality seen through the windshield 104. According to embodiments, the generated content may be displayed to correspond to the front environment.

The communication interface 210 may support a designated protocol which enables a connection to an external device (e.g., another device 103) by wire or wirelessly. According to an embodiment, the communication interface 210 may include a high definition multimedia interface (HDMI), a universal serial bus (USB) interface, an SD card interface, or an audio interface. The communication interface 210 may include a connection terminal (or a connector) which can physically connect the electronic device 101 and an external electronic device (e.g., another device 103). The connection terminal may include, for example, an HDMI connector, a USB connector, an SD card connector, or an audio connector (e.g., a headphone connector).

The communication interface 210 may support establishing a wired or wireless communication channel between the electronic device 101 and an external device (e.g., another device 103 or a server), and performing communication through the established communication channel. The communication interface 210 may include one or more communication processors supporting wired communication or wireless communication, which is operated independently of the processor 220 (e.g., an application processor). According to an embodiment, the communication interface 210 may include a wireless communication module (e.g., a cellular communication module, a short-range wireless communication module, or a global navigation satellite system (GNSS) communication module) or a wired communication module (e.g., a local area network (LAN) communication module or a power line communication module), and communicate with an external electronic device (e.g., another device 103) through a first network (e.g., a short-range communication network such as Bluetooth, Wi-Fi direct, or infrared data association (IrDA)) or a second network (e.g., a telecommunication network such as a cellular network, the Internet, or a computer network (e.g., LAN or WAN)) by using a corresponding communication module among the communication modules. The various types of communication interfaces 210 described above may be implemented as one chip or may be implemented as separate chips, respectively. According to an embodiment, the wireless communication module may distinguish and authenticate the electronic device 101 in a communication network by using user information stored in a subscriber identification module.

The communication interface 210 may include an antenna module. The antenna module may include one or more antennas for transmitting a signal or power to the outside or receiving the same from the outside. According to an embodiment, the communication interface 210 (e.g., a wireless communication module) may transmit a signal to an external electronic device through an antenna suitable for a communication scheme, or receive the signal from the external electronic device. In various embodiments, the communication interface 210 may receive at least one sensor value sensed by another device 103 from another device 103. The at least one sensor value may include, for example, at least one of a current location of another device 103, a moving speed, or a distance from another object located around another device 103.

Some of the components of the electronic device 101 may be connected to each other through a communication scheme (e.g., a bus, general purpose input/output (GPIO), a serial peripheral interface (SPI), or a mobile industry processor interface (MIPI)) between peripheral devices to exchange a signal (e.g., a command or data) with each other. According to an embodiment, the command or data may be transmitted or received between the electronic device 101 and another device 103 through a server connected to the second network. Another device 103 may be the same as or a different type of device from the electronic device 101. According to an embodiment, all or a part of operations executed by the electronic device 101 may be executed in one or a plurality of external electronic devices. According to an embodiment, when the electronic device 101 is required to perform a certain function or service automatically or by request, the electronic device 101 may request at least some functions associated with the function or service from an external electronic device, instead of or in addition to autonomously executing the function or service. The external electronic device having received the request may execute the requested function or an additional function, and transmit a result of the execution to the electronic device 101. The electronic device 101 may process the received result as it is or additionally to provide the requested function or service. To this end, for example, cloud computing, distributed computing, or client-server computing technologies may be used.

The head-up display 240 may include components for displaying a content on the windshield 104 of FIG. 1. The head-up display 240 may include, for example, at least one of an LED-array capable of generating image information, an LED power source capable of supplying a current to the LED-array, or a thin film transistor (TFT)-projection display for displaying image information. The head-up display 240 may emit (or project) an image of a content to (or onto) the windshield 104 so that the content is displayed through the windshield 104.

The memory 230 may store various pieces of data used by at least one component (e.g., the processor 220 or the head-up display 240) of the electronic device 101, for example, software and input data or output data for a command related thereto. The memory 230 may include a volatile memory or a non-volatile memory. According to an embodiment, the memory 230 may include configuration information of a content for display of the head-up display 240. The configuration information of the content may include, for example, information on at least one of the type of content (e.g., an augmented reality (AR) content, an icon, a figure, a curve, and a text), a color of the content, a size of the content, and a display location of the content.

Although not illustrated, the electronic device 101 may include an input device. The input device may be used to receive an input from a user located within the in-vehicle environment 100. In various embodiments, the input device may be disposed in a partial area of a dashboard in the environment 100 to receive the input from the user located within the environment 100. For example, the input device may be disposed in an area in which a center fascia is located in the dashboard in the environment 100 or an area around the center fascia, so as to allow the user in the environment 100 to control a specific function of a vehicle through the input device in a state where the user in the environment 100 sits in a driver's seat (or a passenger seat).

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via another element (e.g., third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, the "module" may be implemented in the form of an application-specific integrated circuit (ASIC).

Various embodiments as set forth herein may be implemented as software (e.g., program) including one or more instructions that are stored in a storage medium (e.g., internal memory or external memory) that is readable by a machine (e.g., computer). For example, the machine is a device that can invoke the instructions stored in the storage medium and operate according to invoked instructions, and may include an electronic device according to the disclosed embodiments (e.g., the electronic device 101). When the instructions are executed by a processor (e.g., the processor 220), the processor may perform functions corresponding to the instructions directly or by using one or more other components under the control of the processor. The instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., module or program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

According to various embodiments, an electronic device (e.g., the electronic device 101) attachable to an inside of a vehicle may include the communication interface 210, the memory 230 configured to store instructions, and at least one processor (e.g., the processor 220) connected to the communication interface 210 and the memory 230, wherein the at least one processor is configured to execute the stored instructions to acquire, from another device embedded in the vehicle, information on a plurality of objects located within a designated distance from the vehicle, identify, among the plurality of objects, a designated object located within the designated distance from the vehicle, generate configuration information of at least one content to be displayed through the head-up display 240, based on a state of the designated object, and display, through the head-up display 240, a content for guiding an operation of the vehicle, based on the generated configuration information.

According to various embodiments, the at least one processor may be further configured to execute the stored instructions to acquire information on a route related to the vehicle from an application related to the route, based on detecting an input for requesting route guidance, the designated object among the plurality of objects may be located within the designated distance from the vehicle and associated with the route, and the configuration information of the at least one content may include configuration information of a content for indicating the route.

In various embodiments, the at least one processor may be configured to execute the stored instructions to determine, in response to detecting an input related to a location of the vehicle, the designated object as another vehicle related to a direction indicated by the input, determine a distance from the another vehicle, and, based on the determination, generate configuration information of a content for guiding the route.

In various embodiments, the content may include a figure indicating the route, and the at least one processor may be configured to execute the stored instructions to determine an inflection point of the figure to correspond to the distance from the another vehicle.

In various embodiments, the content may include a figure indicating the route, and the at least one processor may be configured to execute the stored instructions to display a final point indicated by the figure behind the another vehicle to correspond to a location of the another vehicle, or maintain a display of a destination while the figure is distinguished from the another vehicle and displayed.

In various embodiments, the input related to the location of the vehicle may include an input for changing a lane in which the vehicle is located, or an input for turning on a turn signal of the vehicle.

In various embodiments, the state of the designated object may include a state of a color of a signal indicated by a traffic light, in accordance with the designated object including the traffic light, and the at least one processor may be configured to execute the stored instructions to generate the configuration information of the at least one content, based on the state of the color of the signal.

In various embodiments, the at least one processor may be configured to execute the stored instructions to generate, in accordance with the color of the signal indicated by the traffic light being a designated color, configuration information for displaying the at least one content in a color corresponding to the designated color.

In various embodiments, in accordance with the designated object including the traffic light, the state of the designated object may include a location of the traffic light, and the at least one processor may be configured to execute the stored instructions to generate the configuration information of the at least one content, based on the location of the traffic light.

In various embodiments, the at least one content may include a 3-dimensional (3D) content or an augmented reality (AR) content, and the state of the designated object may include at least one of the type, location, size, shape, or color of the designated object.

Figure 3:
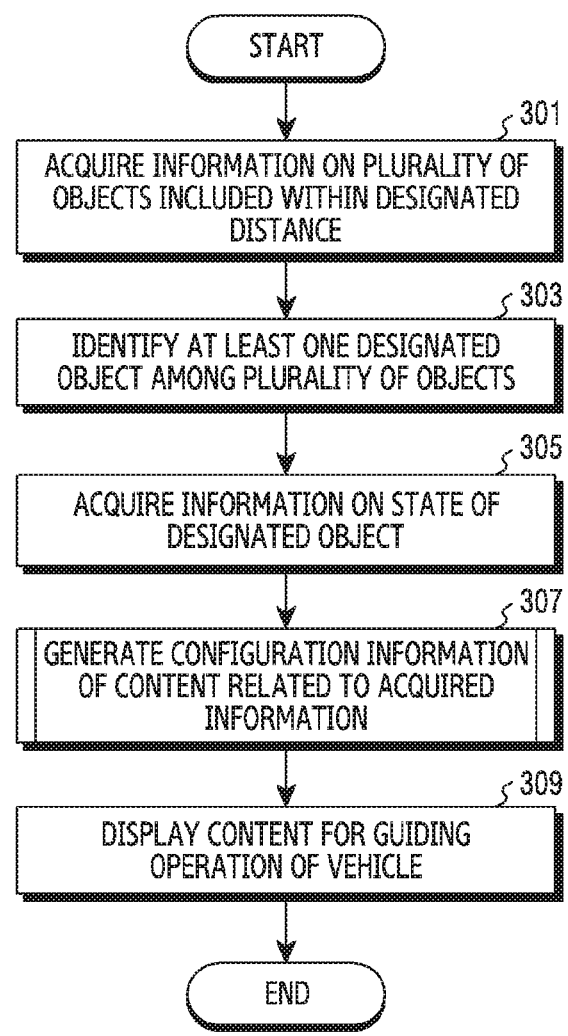
FIG. 3 illustrates an example of an operation of an electronic device according to various embodiments.

FIG. 3 illustrates an example of an operation of an electronic device according to various embodiments. The electronic device of FIG. 3 may be the electronic device 101 of FIG. 2.

Referring to FIG. 3, in operation 301, the processor 220 may acquire information on a plurality of objects included within a designated distance. The processor 220 may be located in the same vehicle as another device 103, so as to acquire the information on the plurality of objects through another device 103. According to an embodiment, the processor 220 may acquire the information on the plurality of objects included within the designated distance, in accordance with the start of driving of the vehicle. Examples of the plurality of objects will be described later through descriptions of FIGS. 5 to 13.

In various embodiments, the processor 220 may be connected by wire or wirelessly to another device 103, and receive the information (or a sensor value) on the plurality of objects from another device 103, based on the connection. According to an embodiment, the plurality of objects may be fixed structures located around the processor 220. The fixed structures may include trees, buildings, facilities on the road (e.g., a street light, a traffic light, a speed detector, a central reservation, a lane, etc.), and the like. According to another embodiment, the plurality of objects may be non-fixed objects (e.g., dynamic objects), such as another vehicle, a person, and an animal, located around the processor 220. The information (hereinafter, a sensor value) on the plurality of objects may include information acquired by a sensor or a system included in another device 103.

In various embodiments, the sensor value may indicate the information on the plurality of objects located within the designated distance. In some embodiments, the sensor value may include relevant information between another vehicle and a vehicle including the electronic device 101 (or a vehicle including another device 103). The relevant information may be information indicating a relation between the another vehicle and the vehicle including the electronic device 101. For example, the relevant information may include at least one of a distance between the another vehicle and the vehicle, a location of the another vehicle within a designated distance range, a size of the another vehicle (e.g., a width, a depth, and a length), and a shape of the another vehicle. In some other embodiments, the sensor value may include at least one piece of information on another vehicle approaching the front, rear, or lateral side of the vehicle with reference to a location of the vehicle. The information on the approaching vehicle may include, for example, information indicating whether there is an approaching vehicle. In some other embodiments, the sensor value may include information on a lane located within a designated distance from the vehicle. The information on the lane may include, for example, information on at least one of a width of the lane, a shape of the lane, or a location of the current lane in which the vehicle including the electronic device 101 is located. In some other embodiments, the sensor value may include information on a dynamic object other than a vehicle. The dynamic object may include, for example, a person, an animal, or a bicycle located around the vehicle including the electronic device 101. In some other embodiments, the sensor value may indicate traffic information such as information on a traffic signal or a sign. The traffic information may include, for example, signal information of a traffic light, location information of the traffic light, location information of a stop line, information on the existence and nonexistence of the shoulder of a road, location information of the shoulder of a road, information on the existence and nonexistence of a crosswalk, location information of the crosswalk, information on the existence and nonexistence of a school zone, and location information of the school zone.

In operation 303, the processor 220 may identify at least one designated object (hereinafter, a designated object) among the plurality of objects. Information on the designated object may be stored in the memory 230 of the electronic device 101. The processor 220 may identify whether the designated object is included among the plurality of objects, based on the stored information. The processor 220 may identify information on the plurality of objects to determine the designated object. The designated object may include, for example, a dynamic object or a fixed object. Examples of the designated object will be described later with reference to FIGS. 5 to 13.

In operation 305, the processor 220 may acquire information on a state of the designated object. The processor 220 may acquire the information on the state of the designated object among the information on the plurality of objects by identifying the designated object.

In various embodiments, the information on the state of the designated object may include, for example, a location of the designated object, a movement of the designated object, or information indicated by the designated object. In some embodiments, when the designated object is another vehicle, the processor 220 may acquire information on at least one of a location of the another vehicle, a distance between the another vehicle and the vehicle including the electronic device 101, a direction of movement of the another vehicle, a speed of the another vehicle, a size of the another vehicle, or a shape of the another vehicle. In some other embodiments, when the designated object is a traffic light, the processor 220 may acquire information on at least one of a location of the traffic light, information on a color of the traffic light, or a distance between the traffic light and the vehicle including the electronic device 101.

In operation 307, the processor 220 may generate configuration information of a content related to the acquired information. The processor 220 may generate (or determine) configuration information of a content for displaying the content, based on the state of the designated object. For example, the processor 220 may determine the configuration information of the content, based on a location (e.g., the front or rear) of the designated object. For another example, the processor 220 may determine the configuration information of the content, based on information (e.g., a color of a traffic light) indicated by the designated object.

In various embodiments, the configuration information of the content may include information on a content, a location where the content is displayed, or a form in which the content is displayed. The location where the content is displayed may be determined to be mapped to a location of an object of reality, based on information acquired through another device 103. The form in which the content is displayed may include at least one of a location of an inflection point of the content, a direction indicated by the content, or a color of the content, in accordance with the size (e.g., a width, a depth, and a length) of the content, the shape of the content, and the content including a curve.

In various embodiments, when there is a content which has already been generated and is being displayed (e.g., a content for route guidance), the configuration information of the content may include change information of the content being displayed. For example, when a content indicating a straight line-shaped arrow is being displayed, the configuration information of the content may include information for changing the shape of an arrow into a curve and displaying the same. The information for changing the shape into a curve and displaying the same may include information on the location of the inflection point.

In various embodiments, the configuration information of the content may be stored in the memory 230. The processor 220 may determine (or generate) the configuration information of the content, based on the stored information. In some embodiments, the configuration information of the content may be stored in an external server. The processor 220 may determine (or generate) the configuration information of the content, based on a connection with an external server. The specific operation related to operation 307 will be described later through descriptions of FIGS. 4 to 13.

In operation 309, the processor 220 may display a content for guiding an operation of a vehicle. The processor 220 may provide the content through the head-up display 240, based on configuration information of the generated content. The provided content may be displayed on the windshield 104. The provided content may be mapped to a front object visible through the windshield 104 (or correspond to a location related to the front object), and displayed on the windshield 104.

In various embodiments, when another vehicle is located in front, the processor 220 may display the generated content, based on a location of the vehicle. When another vehicle is located in front, the processor 220 may determine a space between the another vehicle and the vehicle including the electronic device 101. The processor 220 may display a content for guiding a route, so as to be mapped to a space between the another vehicle and the vehicle including the electronic device 101 on the windshield 104. For example, based on generating a content for guiding a change of a lane, a final point indicated by the content may be displayed to be located behind another vehicle located in a lane to be changed to.

In various embodiments, when there is a content being displayed on the windshield 104, the processor 220 may change the content being displayed, based on the configuration information of the generated content. For example, based on information on the location of the designated object, the processor 220 may change the content for route guidance into the form of a curve and display the same, so as to prevent the content for route guidance from overlapping with the designated object.

In various embodiments, the windshield 104 on which the generated content is displayed may be discussed with reference to FIG. 7 to 9, 11, or 12. The processor 220 may adaptively change the content displayed on the windshield 104 according to an environment which changes in real time. The processor 220 may provide a sense of reality to a user by displaying a 3D (or AR) type content mapped to an object of reality. The content is displayed on the windshield 104, so that the electronic device 101 can prevent diversion of a driver's attention during driving of a vehicle. The diversion of the driver's attention is prevented, so that the electronic device 101 enables safe driving of the vehicle including the electronic device 101.

Figure 4:
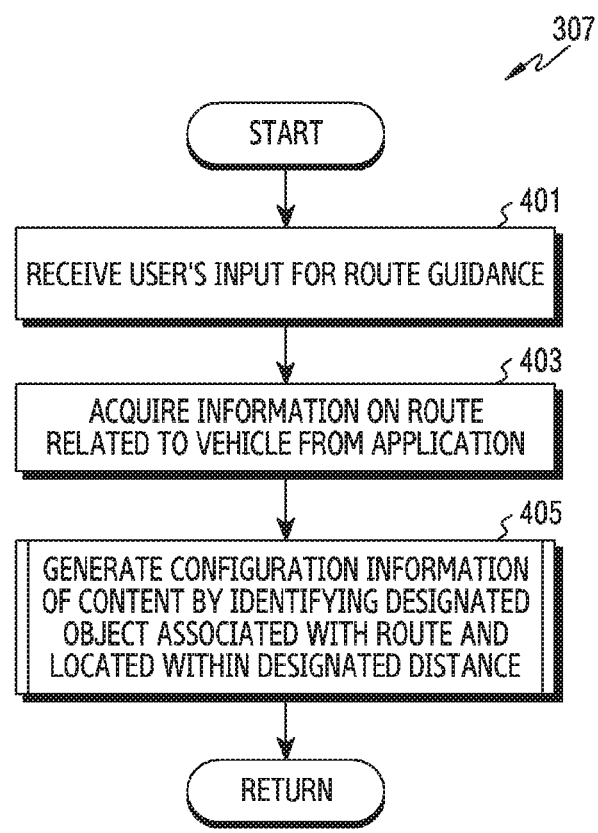
FIG. 4 illustrates an example of an operation of an electronic device related to route guidance according to various embodiments.

FIG. 4 illustrates an example of an operation of an electronic device related to route guidance according to various embodiments. Operations 401 to 405 of FIG. 4 may be related to operation 307 of FIG. 3. The operations illustrated in FIG. 4 may not be essential elements for performing operation 307 of FIG. 3. In other words, it should be noted that operations 401 to 405 of FIG. 4 are one embodiment and may be omitted according to embodiments.

Referring to FIG. 4, in operation 401, the processor 220 may receive a user's input for route guidance. The electronic device 101 may include an input device for receiving the user's input, and receive the user's input through the input device. The processor 220 may receive the user's input for triggering route guidance. The user's input may include, for example, an input for execution of a route guidance application (or a navigation application). For another example, the user's input may include an input for turning on power of a navigation system, an input for executing a navigation application, an input for setting a destination in the navigation application, or an input for requesting the start of route guidance. The user's input may include various inputs which cause the operation of the processor 220 for route guidance, but is not limited to the above-described example.

In operation 403, the processor 220 may acquire information on a route related to a vehicle from an application. The application may include an application (e.g., a navigation application) for route guidance. By receiving the user's input for route guidance, the processor 220 may acquire information on the route from the application.

According to an embodiment, the information on the route may be stored in the application and a server. The processor 220 may receive the information on the route from the server in response to receiving the user's input. The information on the route will be described later through description of FIG. 5.

Although not illustrated, in various embodiments, while operations 301 to 305 of FIG. 3 are performed, operations 401 and 403 of FIG. 4 may be performed in parallel or in any order.

In operation 405, the processor 220 may generate configuration information of a content by identifying a designated object related to the route and located within a designated distance. In various embodiments, the processor 220 may acquire information on at least one object (e.g., another vehicle or a traffic light) included in a designated distance from a vehicle (or the electronic device 101) including the electronic device 101 and located on the route, in response to receiving the information on the route. The processor 220 may identify whether at least one object includes the designated object, based on the acquired information. When at least one object includes the designated object, the processor 220 may generate configuration information of a content related to the designated object. For example, the processor may generate configuration information of a content for mapping a content for route guidance to the designated object and displaying the mapped content.

Figure 5:
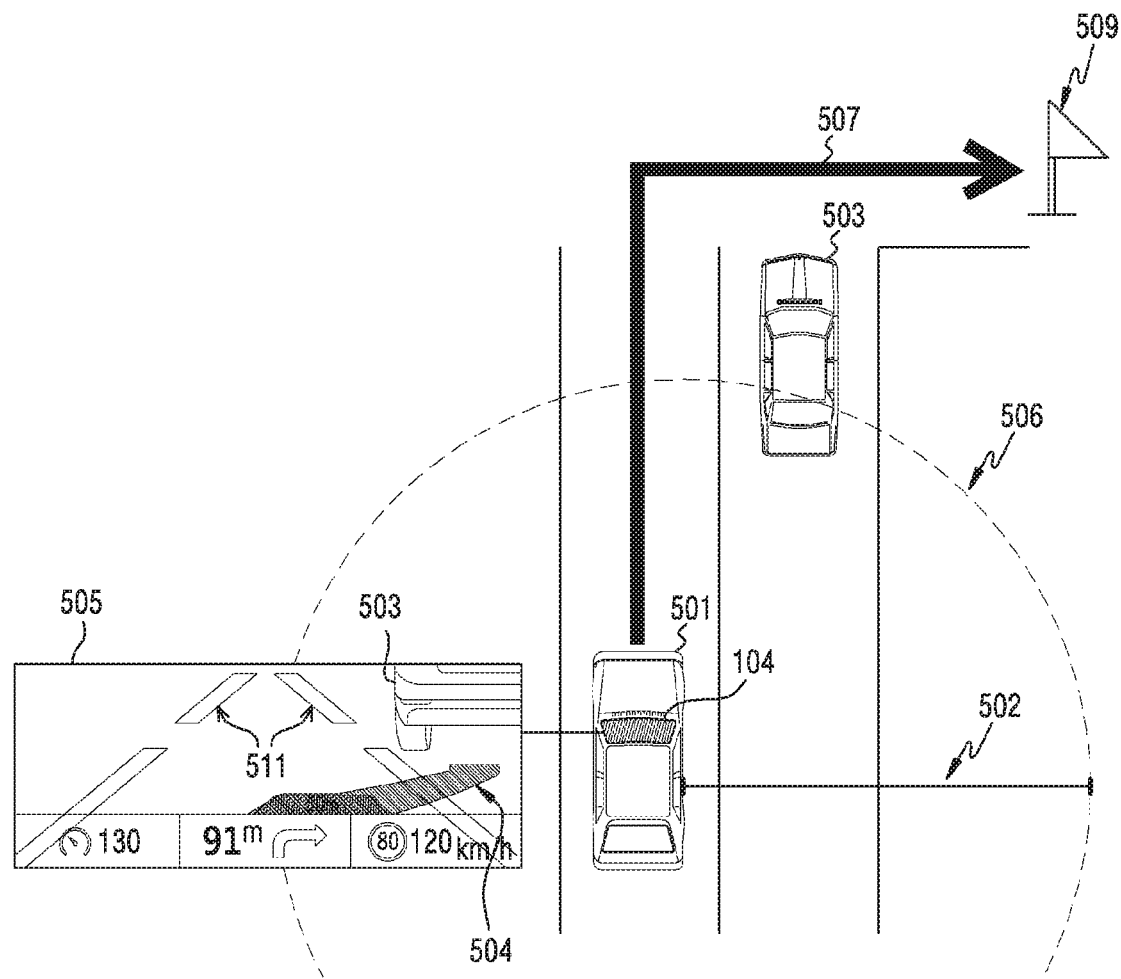
FIG. 5 illustrates an example of configuration information of a content related to route guidance according to various embodiments.

For example, referring to FIG. 5, a designated object (e.g., another vehicle 503) may be located within a designated distance 502 (or a range 506 of the designated distance 502) from a vehicle 501. The range 506 may indicate a specific area having the designated distance 502 based on the vehicle 501 as a radius. The above-described range 506 may be a range configured to determine another vehicle 503 as the designated object, but is not limited thereto.

In various embodiments, the electronic device 101 may acquire information on a location of another vehicle 503 or a distance between another vehicle 503 and the vehicle 501, based on information received from another device 103. The electronic device 101 may identify that another vehicle 503 is adjacent to a route 507 and is located within the designated distance 502. The electronic device 101 may generate configuration information 504 of a content by identifying another vehicle 503.

Referring to FIG. 5, a content indicating driving information of a vehicle including the electronic device 101 may be displayed in at least a part (e.g., the bottom) of the windshield 104. The content displayed at the bottom of the windshield 104 may display at least one of information (e.g., the current driving speed of the vehicle) displayed on a dashboard of the vehicle, a distance to a point where a moving direction of the vehicle is required to be changed, or information on a road currently being driven on. According to embodiments, information displayed at the bottom of the windshield 104 may be omitted. In the drawings (e.g., FIGS. 7 and 8) illustrating a screen displayed on the windshield 104 to be described later, the overlapping description of the content displayed at the bottom of the windshield 104 may be omitted.

The configuration information 504 of the content may include a guide (or a content) for the route 507 in which the vehicle 501 is required to move, in consideration of the location of another vehicle 503. The guide for the route may be generated based on information on the route 507 from the vehicle 501 including the electronic device 101 to a destination 509. The route 507 may be information determined based on pre-stored information in accordance with the destination 509 of the vehicle 501 being set through the electronic device 101. The configuration information 504 of the content may include, for example, a content indicating a distance (for example, 50 m) between the vehicle 501 and another vehicle 503. For another example, in order to guide a change of the route 507 to cause the vehicle to move in a lane changed to the rear of another vehicle 503, the configuration information 504 of the content may be displayed by designating a final location of the route 507 to the rear of another vehicle 503. For another example, the configuration information 504 of the content may include information for indicating a timing of entry into another lane for a lane change.

In various embodiments, the processor 220 may display, on the windshield 104, the configuration information 504 of the content for indicating the route 507 to the destination 509. A front screen 505 may be a screen which appears to a user (or a driver) of the vehicle through the windshield 104. The front screen 505 may include a content indicating information on a speed of the vehicle 501, a distance to the destination of the vehicle 501, or road rules for the road currently being driven on, based on information acquired from another device 103. The front screen 505 may be a screen in which a real object such as a lane 511 or another vehicle 503 appears through the windshield 104. According to embodiments, the front screen 505 may include a screen in which a virtual content appears together with the real object. The user of the vehicle may recognize the real object and virtual content together through the front screen 505.

In various embodiments, the processor 220 may flexibly change and display guidance on the route, based on information acquired from another device 103. The processor 220 may change a content for route guidance being displayed, based on information of a surrounding environment acquired in real time from another device 103. For example, the processor 220 may change the content for route guidance, based on a distance from another vehicle, a speed of another vehicle, and the like, when the processor 220 identifies another vehicle around the vehicle including the electronic device 101. For another example, when the processor 220 identifies a traffic light around the vehicle including the electronic device 101, the processor 220 may change a color of the content for route guidance into a color of the traffic light. For another example, when the processor 220 identifies a person in front of the vehicle including the electronic device 101, the processor 220 may display the color of the displayed content or the size of the displayed content to warn that there is the person.

In various embodiments, when the designated object is not included among at least one object, the processor 220 may generate configuration information of a content, based on information provided from a server for route guidance. Various embodiments related to operation 405 will be described later through descriptions of FIGS. 6 to 12.

Figure 6:
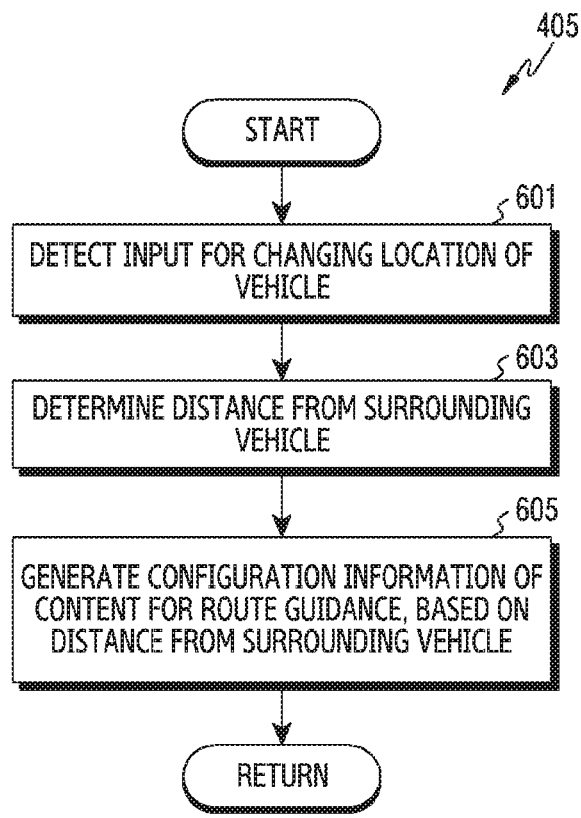
FIG. 6 illustrates another example of an operation of an electronic device related to movement of a vehicle according to various embodiments.

FIG. 6 illustrates another example of an operation of an electronic device related to movement of a vehicle according to various embodiments. Operations 601 to 605 of FIG. 6 may be related to operation 405 of FIG. 4. The operations illustrated in FIG. 6 may not be essential elements for performing operation 405 of FIG. 4. In other words, it should be noted that operations 601 to 605 of FIG. 6 are one embodiment and thus may be omitted according to embodiments.

Referring to FIG. 6, in operation 601, the processor 220 may detect an input for changing a location of a vehicle. In various embodiments, the processor 220 may detect a user's input for changing a location of the vehicle through the communication interface 210 or an input device. The location of the vehicle may include the location of the vehicle being driven. The user's input may include an input for switching on (or turning on) a turn signal to indicate a change in direction. The user's input may include, for example, an input for turning on the turn signal to indicate a lane change. For another example, the user's input may include an input for turning on the turn signal to make a turn (e.g., a right turn or a left turn).

Figure 7:
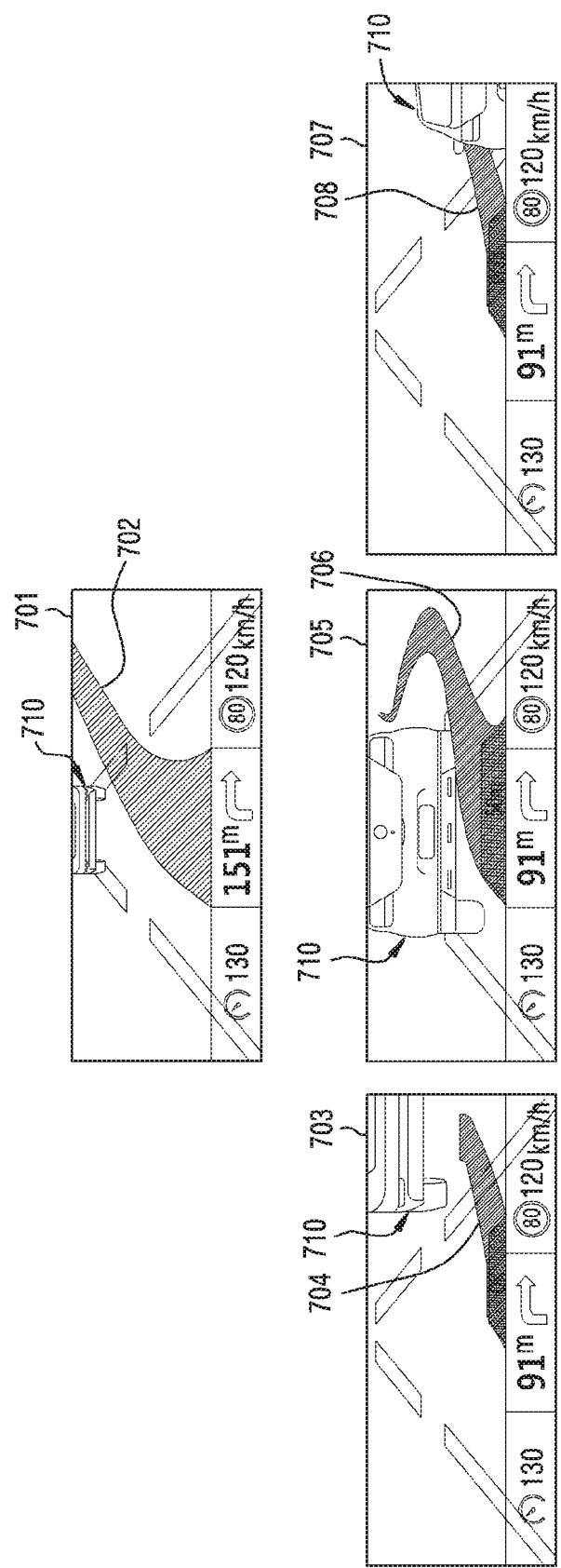
FIG. 7 illustrates an example of configuration information of a content related to movement of a vehicle according to various embodiments.

In various embodiments, referring to FIG. 7, a screen 701 shows an example of a scene seen on the windshield 104 before the input for changing the location of the vehicle is detected. The screen 701 may acquire, from another device 103, information on a plurality of objects (e.g., a vehicle 701 or a lane) located around the vehicle including the electronic device 101. The information on the plurality of objects may include, for example, a location of a vehicle 710, a moving speed of the vehicle 710, or a location of a lane. According to embodiments, in an environment of the vehicle in which the screen 701 is displayed, the processor 220 may detect a user's input corresponding to guidance of a content 702 for route guidance. The detected user's input may include an input for turning on a turn signal to move in a direction indicated by the content 702.

In various embodiments, in response to detecting the input for changing the location of the vehicle, the processor 220 may determine, as a designated object, another vehicle (e.g., another vehicle 503) among the plurality of objects located around the vehicle including the electronic device 101. The processor 220 may determine, as the designated object, another vehicle (e.g., another vehicle 503) related to the location of the vehicle among the plurality of objects. For example, in accordance with the processor 220 detecting an input of the user who intends to move to the right, the processor 220 may determine another vehicle as the designated object. The description related to the above-described example will be described later through description of FIG. 7.

In operation 603, the processor 220 may determine (or identify) a distance from a surrounding vehicle. The processor 220 may determine a distance (or a space) to a surrounding vehicle in response to detecting the input for changing the location of the vehicle. The processor 220 may identify a distance from another vehicle, based on information on a plurality of objects. The information on the plurality of objects may include various pieces information (e.g., a shape of another vehicle, a size of another vehicle, a distance of another vehicle, or a location of a lane) related to the plurality of objects (e.g., another vehicle, traffic lights, or lanes) located around the processor 220. The processor 220 may identify, among the information, a distance from a vehicle located on the side, rear, or front side among the plurality of objects around the vehicle including the electronic device 101.

In operation 605, the processor 220 may generate configuration information of a content for route guidance, based on the distance from the surrounding vehicle. In various embodiments, the processor 220 may generate the configuration information of the content for route guidance, based on information on a route and/or the distance from the surrounding vehicle. According to embodiments, the configuration information of the content may include various pieces of information related to the content. For example, the configuration information of the content may include information on a content, a location where the content is displayed, or a form in which the content is displayed. The content for route guidance generated based on the distance from the surrounding vehicle will be described later through description of FIG. 7, 8, or 9.

In various embodiments, the processor 220 may generate configuration information of various contents for route guidance, based on a state of the surrounding vehicle. For example, referring to FIG. 7, a screen 703, a screen 705, or a screen 707 may include another vehicle (e.g., another vehicle 710) located around the vehicle including the electronic device 101. In this case, the processor 220 may generate a content (e.g., a content 704, a content 706, or a content 708) indicating whether a lane can be changed, by identifying a distance from another vehicle 710.

On the screen 703, another vehicle 710 may be located in the front of and to the right of the vehicle including the electronic device 101. The processor 220 may generate the content 704, based on detecting an input for moving to the right (e.g., an input for turning on a right turn signal). The content 704 may include a text (e.g., OK) for notifying that a lane change is possible. The processor 220 may generate configuration information (or the content 704) of the content 704 configured to have a final point of a route oriented toward the rear of another vehicle 710.

On the screen 705, another vehicle 710 may be located in front of the vehicle including the electronic device 101. The processor 220 may generate the content 706, based on detecting the input for moving to the right. The content 706 may include a text for guiding a lane change. The text for guiding a lane change may include, for example, information on a space (e.g., 50 m) from another vehicle required for a lane change. The information on the space (e.g., 50 m) may be stored in advance in the server or memory 230. Although not illustrated, when a space from another vehicle 710 corresponds to a pre-stored space, the processor 220 may generate a text (e.g., OK) for notifying that a lane change is possible. The processor 220 may generate the configuration information (or the content 704) of the content 704 so that a final point of a route is oriented toward the rear of another vehicle 710.

For example, referring to FIG. 7, another vehicle 710 on the screen 707 may be located behind and to the right of the vehicle including the electronic device 101. The processor 220 may generate the content 708, based on detecting the input for moving to the right. The processor 220 may determine whether another vehicle 710 is within a specific distance from the vehicle including the electronic device 101. Based on the determination, the processor 220 may generate a content for guiding a timing of a lane change. The specific distance may be designated in advance and stored in the memory 230 or the server. The specific distance may include a distance in which a collision with another vehicle 710 is expected when a lane is changed. A text for guiding a timing of a lane change may include, for example, "wait". Although not illustrated, when a space from another vehicle 710 is greater than or equal to (or exceeds) a specific distance, the processor 220 may generate a content including the text (e.g., OK) for notifying that a lane change is possible.

Figure 8:
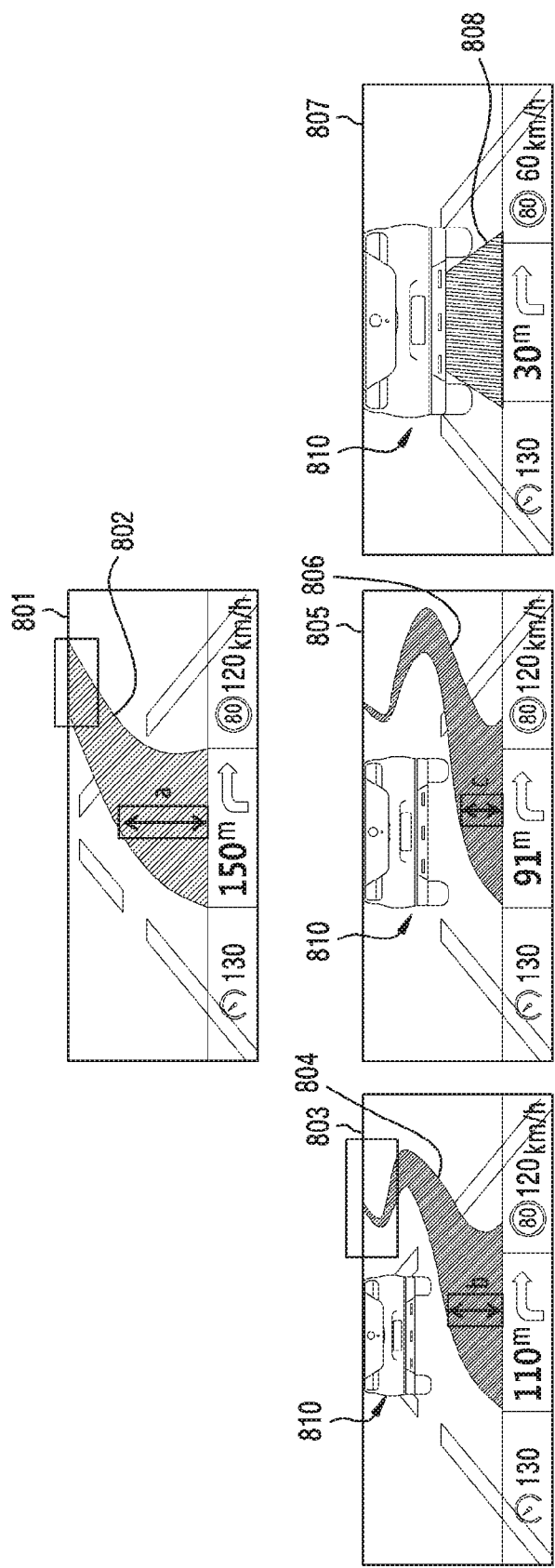
FIG. 8 illustrates another example of configuration information of a content related to movement of a vehicle according to various embodiments.

In various embodiments, referring to FIG. 8, the processor 220 may generate configuration information of various contents having different inflection points. The processor 220 may generate a content (e.g., a content 802, a content 804, a content 806, or a content 808), based on a distance from a vehicle ahead. When there is no other vehicle in front, the processor 220 may generate the content 802 for route guidance included in a screen 801. According to embodiments, the processor 220 may change the displayed content 802 or generate different types of content, according to a distance from another vehicle or a situation. For example, the processor 220 may generate contents (e.g., the content 804, the content 806, and the content 808) having different inflection points, based on a distance from another vehicle.

Referring to a screen 803, the processor 220 may generate the content 804 including distance b to an inflection point, when the processor identifies another vehicle located 110 m to the front thereof. The processor 220 may change the content 802 for route guidance to the content 804.

Referring to a screen 805, the processor 220 may generate the content 806 including distance c to an inflection point, when the processor identifies another vehicle located 91 m to the front thereof. The distance to the inflection point may be proportional to a distance between the vehicle including the electronic device 101 and another vehicle. For example, distance b to the inflection point for the another vehicle 110 m ahead may be longer than distance c to the inflection point for the another vehicle 91 m ahead.

Referring to a screen 807, the processor 220 may identify another vehicle located 30 m to the front thereof. The processor 220 may determine that the distance of 30 m is too short a distance to change the location of the vehicle. Based on the determination, the processor 220 may generate the content 808 for warning of a collision with a vehicle ahead, without indicating a moving direction of the vehicle. For example, the processor 220 may display a color of the content 808 in red to warn of a collision, based on determining that a space between another vehicle and the vehicle including the electronic device 101 is less than or equal to a designated space. For another example, the processor 220 may include a device for sound output to output a warning sound for notifying of a collision, together with a display of a content. The processor 220 may provide guides in various ways for warning of a collision, and is not limited to the above-described example. In accordance with a distance between the vehicle including the electronic device 101 and another vehicle becoming farther than a specific distance, the processor 220 may generate a curve-shaped content (e.g., the content 804 or content 806) having an inflection point, such as the screen 801, the screen 803, or the screen 805.

Figure 9:
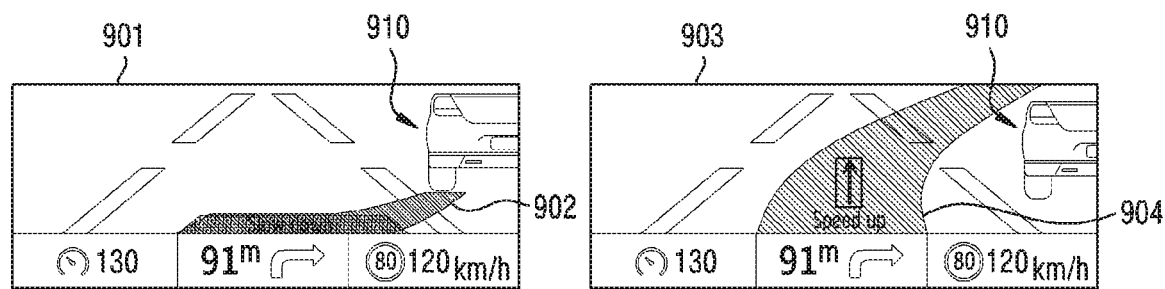
FIG. 9 illustrates another example of configuration information of a content related to movement of a vehicle according to various embodiments.

In various embodiments, referring to FIG. 9, in response to detecting an input for changing a location of a vehicle, the processor 220 may generate a content (e.g., a content 902 of FIG. 9 or a content 904 of FIG. 9) for guiding control of a speed of the vehicle including the electronic device 101.

In various embodiments, based on detecting another vehicle located on the side of the vehicle including the electronic device 101, the processor 220 may generate a content (e.g., the content 902 or the content 904) indicating the speed for changing the location of the vehicle. Referring to FIG. 9, on a screen 901, based on determining a location or speed of another vehicle 910, the processor 220 may generate a content (e.g., the content 902) for guiding control of the speed of the vehicle including the electronic device 101.

In some embodiments, the processor 220 may determine whether another vehicle 910 is located outside a specific distance from the vehicle including the electronic device 101 (or moves at a specific speed or more). The processor 220 may generate configuration information of a content for guiding driving, based on determining that another vehicle 910 is located outside a specific distance (or moves at a specific speed or more). For example, the processor 220 may generate a content for guiding the vehicle to slow down. For another example, the processor 220 may generate the content 902 for inducing a lane change to the rear of another vehicle 910.

In some embodiments, the processor 220 may determine whether another vehicle 910 is located within a specific distance from the vehicle including the electronic device 101 (or moves at less than a specific speed). The processor 220 may generate configuration information of a content for guiding driving, based on determining that another vehicle 910 is located within a specific distance (or moves at less than a specific speed). For example, the processor 220 may generate a content for guiding to increase the speed of the vehicle including the electronic device 101. For another example, the processor 220 may generate the content 904 for inducing a lane change to the front of another vehicle 910.

In various embodiments, the processor 220 may acquire information on another vehicle (e.g., another vehicle 910) located in a direction in which the vehicle including the electronic device 101 intends to move. The processor 220 may generate configuration information of a content for indicating whether the vehicle including the electronic device 101 can move in the direction, based on the information on the another vehicle. When the vehicle can move, the processor 220 may generate configuration information of a content for indicating that the vehicle can move. When the vehicle can move, the processor 220 may continuously display the generated configuration information of the content, based on acquiring the information on the another vehicle in real time. Based on a change in the speed of the another vehicle or a change in the location of the another vehicle, when the vehicle cannot move (or is difficult to move), the processor 220 may generate configuration information of a content for indicating that the vehicle cannot move (or is difficult to move).

In various embodiments, the processor 220 provides a content according to information on a surrounding situation, which is received in real time, so that the processor 220 may provide, to a user (or a driver) of the vehicle including the electronic device 101, information on a timing when the location of the vehicle can be changed. The processor 220 may guide a safe change in the location of the vehicle by providing a timing for changing the location of the vehicle or a distance from another adjacent vehicle.

Figure 10:
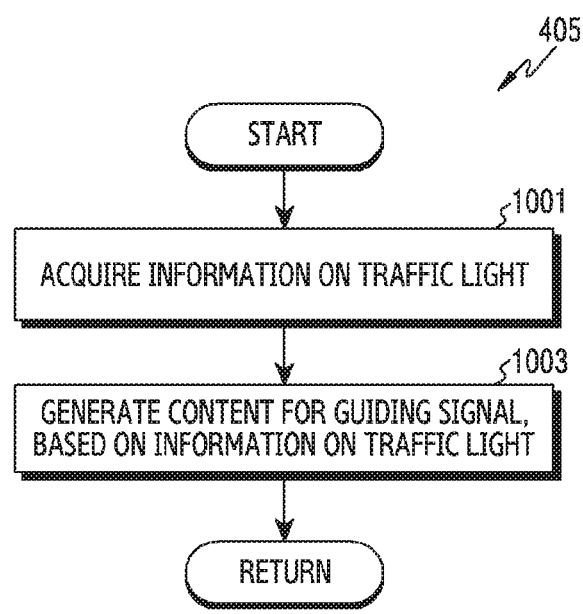
FIG. 10 illustrates an example of an operation of an electronic device for a designated object according to various embodiments.

FIG. 10 illustrates an example of an operation of an electronic device for a designated object according to various embodiments. Operations 1001 to 1003 of FIG. 10 may be related to operation 405 of FIG. 4. The operations illustrated in FIG. 10 may not be essential elements for performing operation 405 of FIG. 4. In other words, it should be noted that operations 1001 to 1003 of FIG. 10 are one embodiment and thus may be omitted according to embodiments.

Figure 11:
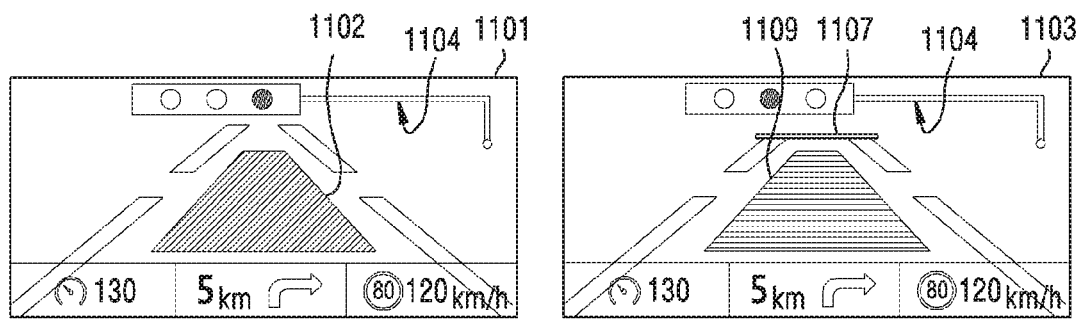
FIG. 11 illustrates an example of configuration information of a content for a designated object according to various embodiments.

Referring to FIG. 10, in operation 1001, based on a designated object including a traffic light, the processor 220 may determine (or identify) information on the traffic light. The information on the traffic light may include, for example, at least one piece of information on a location of the traffic light, a distance between the traffic light and the vehicle including the electronic device 101, or a color of a signal indicated by the traffic light. Referring to FIG. 11, based on identifying that a traffic light 1104 is located within a designated distance, the processor 220 may determine a distance from the traffic light 1104 (or a color (e.g., red, yellow, or green) of a signal indicated by the traffic light 1104).

In operation 1003, the processor 220 may generate a content for guiding a signal, based on the information on the traffic light. Referring to FIG. 11, the content (e.g., a content 1102, a content 1107, or a content 1109) for guiding the signal may be mapped to a road appearing on the windshield 104 and displayed. In some embodiments, the content for guiding the signal may be changed in accordance to a color of a signal indicated by the traffic light 1104. For example, when the color of the signal is red, the processor 220 may generate the content 1102 in red. For another example, when the color of the signal is yellow, the processor 220 may generate the content 1109 in yellow. In some other embodiments, the content for guiding the signal may be generated based on a distance between the traffic light 1104 and the vehicle including the electronic device 101. For example, when the distance between the traffic light 1104 and the vehicle including the electronic device 101 is greater than or equal to a designated distance, as illustrated in a screen 1101, the processor 220 may generate configuration information of a content to be displayed by being mapped in a rectangular shape to the road. When the distance between the traffic light 1104 and the vehicle including the electronic device 101 is less than the designated distance, as illustrated in a screen 1103, the processor 220 may generate configuration information of the content to be displayed by being mapped in a rectangular shape to the road and a content indicating a stop line 1107. Although not illustrated, according to embodiments, the processor 220 may generate configuration information of a content indicating a space between the traffic light and the vehicle, based on the information on the traffic light (e.g., the location of the traffic light). For example, the processor 220 may generate a text (e.g., 50 m) for display along with generation of a content (e.g., an arrow) for route guidance.

In various embodiments, based on a state of a designated object being changed, the processor 220 may generate configuration information of a content reflecting the state of the designated object. The generated configuration information of the content is not limited to the above-described example, and may include various forms for indicating the state of the object.

Figure 12:
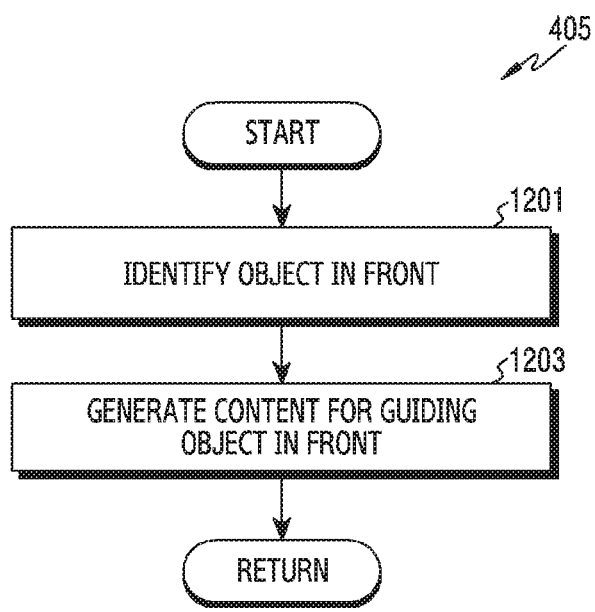
FIG. 12 illustrates another example of an operation of an electronic device for a designated object according to various embodiments.

FIG. 12 illustrates another example of an operation of an electronic device for a designated object according to various embodiments. Operations 1201 to 1203 of FIG. 12 may be related to operation 405 of FIG. 4. The operations illustrated in FIG. 12 may not be essential elements for performing operation 405 of FIG. 4. In other words, it should be noted that operations 1201 to 1203 of FIG. 12 are one embodiment and thus may be omitted according to embodiments.

Referring to FIG. 12, in operation 1201, the processor 220 may determine whether there is an object in front. The processor 220 may identify whether there is an object (e.g., a person, an object, or an animal) which is distinguished from another vehicle in front. The processor 220 may determine (or identify) whether there is an object (e.g., a person, an object, or an animal) which is distinguished from another vehicle in front, based on information received from another device 103. For example, the processor 220 may determine whether there is an object distinguished from another vehicle in front, based on at least one of the size, shape, movement speed, width, or breadth of the object located in front, received from another device 103.

In operation 1203, the processor 220 may generate a content for informing of an object in front. The processor 220 may generate the content for informing of the object in front, based on determining that the object is located in front.

Figure 13:
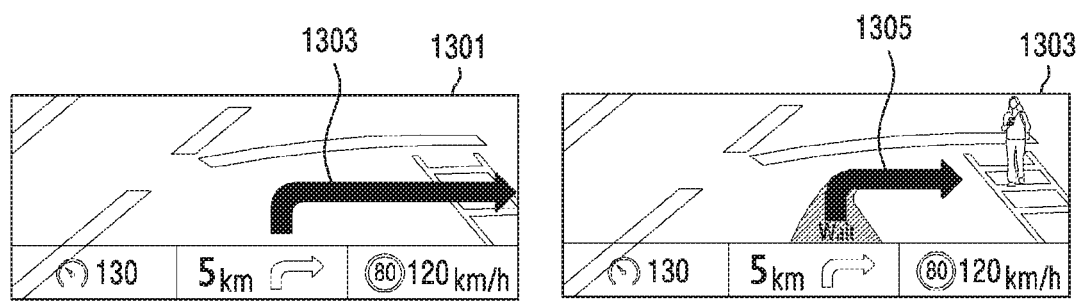
FIG. 13 illustrates another example of configuration information of a content for a designated object according to various embodiments.

For example, referring to FIG. 13, when there is no object in front, the processor 220 may generate a content 1303 displayed on a screen 1301. The content 1303 may include a content displayed based on information on a route predefined by the processor 220. According to embodiments, the processor 220 may change the content 1303 or generate a content 1305, based on detecting an object in front.

Referring to a screen 1303, the processor 220 may generate the content 1305 including a text (e.g., "wait") for notifying that there is an object in front.

In various embodiments, the processor 220 may determine a location of the object in front, based on information received from another device 103. The processor 220 may generate a content for guiding the object in front, based on the location of the object in front. For example, referring to FIG. 13, on the screen 1303, based on determining the location of the object in front, the processor 220 may generate the content 1305 including an arrow indicating a length shorter than a location where the object is located. According to embodiments, when the object in front is recognized, the processor 220 may generate a new content to notify, in real time, a user of the processor 220 that the object is located in front. Based on the notification, the processor 220 may guide the user to drive safely.

According to various embodiments, a method for an electronic device attachable to an inside of a vehicle may include: acquiring, from another device embedded in the vehicle, information on a plurality of objects located within a designated distance from the vehicle; identifying, among the plurality of objects, a designated object located within the designated distance from the vehicle; generating configuration information of at least one content to be displayed through a head-up display, based on a state of the designated object; and displaying, through the head-up display, a content for guiding an operation of the vehicle, based on the generated configuration information.

In various embodiments, the method for the electronic device may further include acquiring information on a route related to the vehicle from an application related to the route, based on detecting an input for requesting route guidance. The designated object among the plurality of objects may be located within the designated distance from the vehicle, and associated with the route, and the configuration information of the at least one content may include configuration information of a content for indicating the route.

In various embodiments, the method for the electronic device may further include: in response to detecting an input related to a location of the vehicle, determining the designated object as another vehicle related to a direction indicated by the input; determining a distance from the another vehicle; and based on the determination, generating configuration information of a content for guiding the route.

In various embodiments, the content may include a figure indicating the route, and the method for the electronic device may further include determining an inflection point of the figure to correspond to the distance from the another vehicle.

In various embodiments, the content may include a figure indicating the route, and the method for the electronic device may further include displaying a final point indicated by the figure behind the another vehicle to correspond to a location of the another vehicle, or maintaining a display of a destination while the figure is distinguished from the another vehicle and displayed.

In various embodiments, the input related to the location of the vehicle may further include an input for changing a lane in which the vehicle is located, or an input for turning on a turn signal of the vehicle.

In various embodiments, the state of the designated object may include a state of a color of a signal indicated by a traffic light and a location of the traffic light, in accordance with the designated object including the traffic light. The method for the electronic device may further include generating the configuration information of the at least one content, based on the state of the color of the signal and the location of the traffic light.

In various embodiments, the method for the electronic device may further include displaying, in accordance with the color of the signal indicated by the traffic light being a designated color, the at least one content in a color corresponding to the designated color.

In various embodiments, the at least one content may include a 3D or AR content, and the state of the designated object may include at least one of a type, location, size, shape, or color of the designated object.

According to various embodiments, a non-transitory computer-readable storage medium may store at least one program for executing operations of: acquiring, from another device embedded in a vehicle, information on a plurality of objects located within a designated distance from the vehicle; identifying, among the plurality of objects, a designated object located within the designated distance from the vehicle; generating configuration information of at least one content to be displayed through a head-up display, based on a state of the designated object; and displaying, through the head-up display, a content for guiding an operation of the vehicle, based on the generated configuration information.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes or modifications derived on the basis of the technical idea of the disclosure.

The invention claimed is:

1. An electronic device attachable to an inside of a first vehicle and configured to be coupled to head-up display and at least one sensor included in the first vehicle, the electronic device comprising:
   a communication interface;
   a memory configured to store instructions; and
   at least one processor connected to the communication interface and the memory,
   wherein the at least one processor is configured to execute the stored instructions in order to:
   acquire, from the at least one sensor included in the first vehicle, information on a plurality of objects located within a designated distance from the first vehicle;
   in response to detecting an input for switching on a turn signal to indicate an intention to change a lane of the first vehicle, identify, among the plurality of objects, a second vehicle related to a direction indicated by the input, wherein the second vehicle is different from the first vehicle;
   determine a distance from the second vehicle based on the information on the plurality of objects;
   while the turn signal is switched on, determine a form of a content to be displayed through the head-up display (HUD), wherein the content comprises a text for guiding a timing and an augmented reality (AR)

image showing a path to change the location lane of the first vehicle based on the distance from the second vehicle; and
    display, through the head-up display, the content for guiding an operation of the first vehicle, based on the determined form of the content.

2. The electronic device as claimed in claim 1, wherein the at least one processor is further configured to execute the stored instructions to acquire information on a route related to the first vehicle from an application related to the route, based on detecting an input for requesting route guidance,
    the second vehicle among the plurality of objects is located within the designated distance from first the vehicle and is associated with the route, and
    the content comprises a content for indicating the route.

3. The electronic device as claimed in claim 2, wherein the content comprises a figure indicating the route, and
    the at least one processor is configured to execute the stored instructions to determine an inflection point of the figure to correspond to the distance from the second vehicle.

4. The electronic device as claimed in claim 2, wherein the content comprises a figure indicating the route, and
    the at least one processor is configured to execute the stored instructions to: display a final point indicated by the figure behind the second vehicle to correspond to a location of the second vehicle; or maintain a display of a destination while the figure is distinguished from the second vehicle and displayed.

5. The electronic device as claimed in claim 2, wherein the input indicating the intention to change the location of the first vehicle comprises an input for changing a lane in which the first vehicle is located, or an input for turning on a turn signal of the first vehicle.

6. The electronic device as claimed in claim 1, wherein the content comprises a 3-dimensional (3D) content or an augmented reality (AR) content.

7. A method for an electronic device attachable to an inside of a first vehicle and configured to be coupled to head-up display and at least one sensor included in the first vehicle, the method comprising:
    acquiring, from at least one sensor included in the first vehicle, information on a plurality of objects located within a designated distance from the first vehicle;
    in response to detecting an input for switching on a turn signal to indicate an intention to change a lane of the first vehicle, identifying, among the plurality of objects, a second vehicle related to a direction indicated by the input, wherein the second vehicle is different from the first vehicle:
    determine a distance from the second vehicle based on the information on the plurality of objects;
    while the turn signal is switched on, determine a form of a content to be displayed through the head-up display (HUD), wherein the content comprises a text for guiding a timing and an augmented reality (AR) image showing a path to change the location lane of the first vehicle based on the distance from the second vehicle; and
    displaying, through the head-up display, the content for guiding an operation of the first vehicle, based on the determined form of the content.

8. The method as claimed in claim 7, further comprising acquiring information on a route related to the first vehicle from an application related to the route, based on detecting an input for requesting route guidance,
    wherein the second vehicle among the plurality of objects is located within the designated distance from the first vehicle and is associated with the route, and
    the content comprises a content for indicating the route.

9. The method as claimed in claim 8, wherein the input indicating the intention to change the location of the first vehicle comprises an input for changing a lane in which the first vehicle is located, or an input for turning on a turn signal of the first vehicle.

10. The method as claimed in claim 9, wherein the content comprises a figure indicating the route, and
    the method further comprises determining an inflection point of the figure to correspond to the distance from the second vehicle.

11. The method as claimed in claim 9, wherein the content comprises a figure indicating the route, and
    the method further comprises displaying a final point indicated by the figure behind the second vehicle to correspond to a location of the second vehicle, or maintaining a display of a destination while the figure is distinguished from the second vehicle and displayed.

\* \* \* \* \*